April 7, 1970  J. F. EHRENFRIED ET AL  3,504,476
METHOD OF PACKAGING
Filed July 20, 1967  4 Sheets-Sheet 1
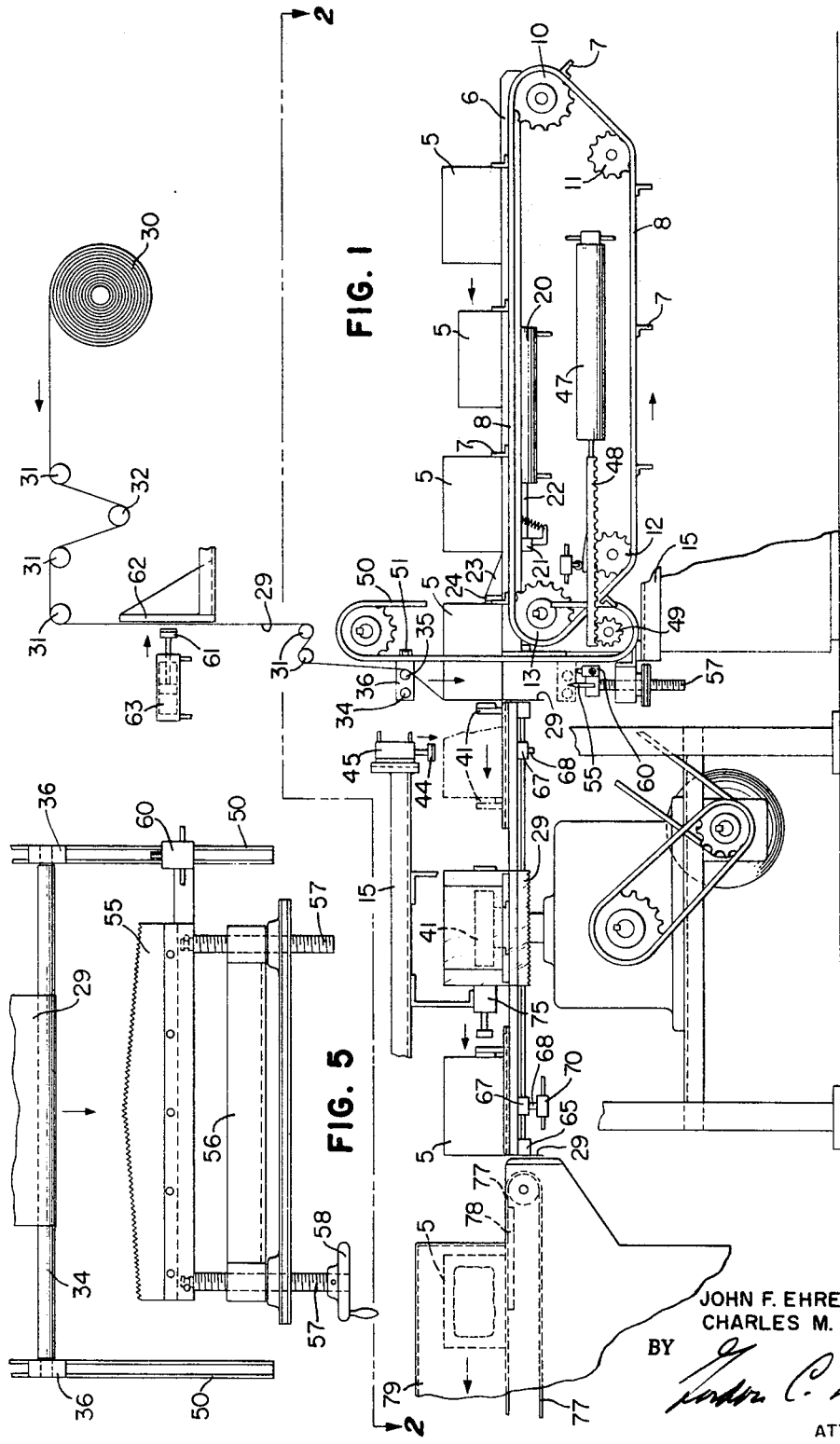
INVENTORS
JOHN F. EHRENFRIED
CHARLES M. GARDNER
BY
ATTORNEY

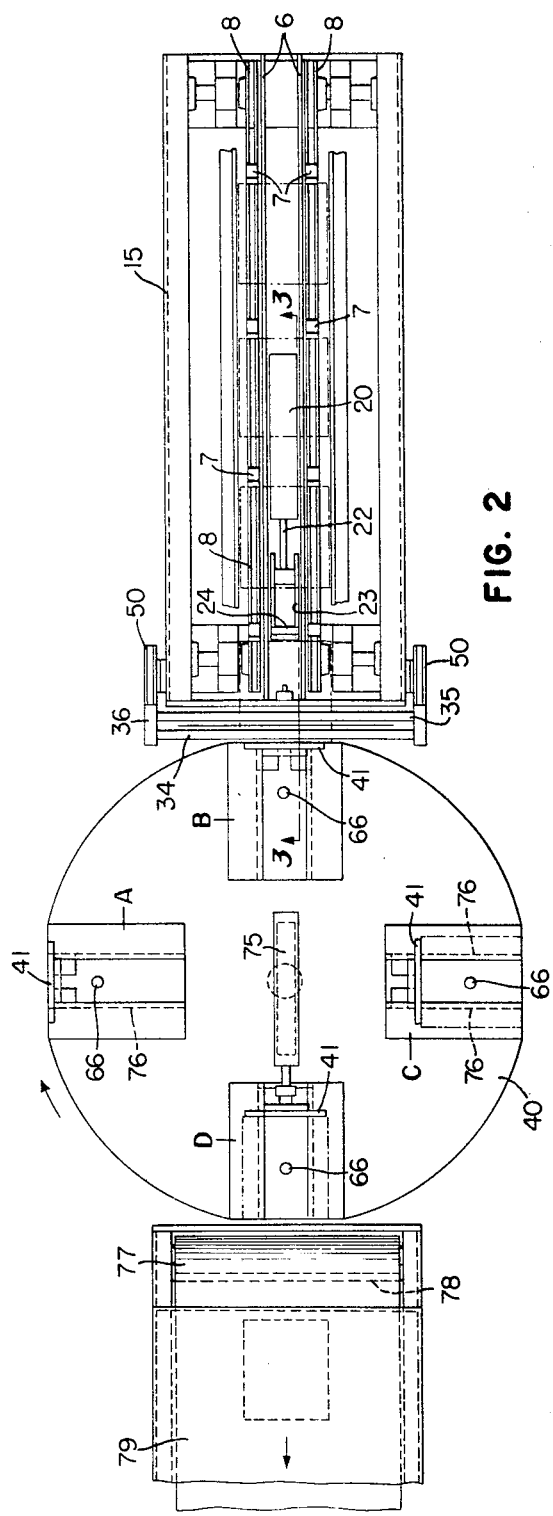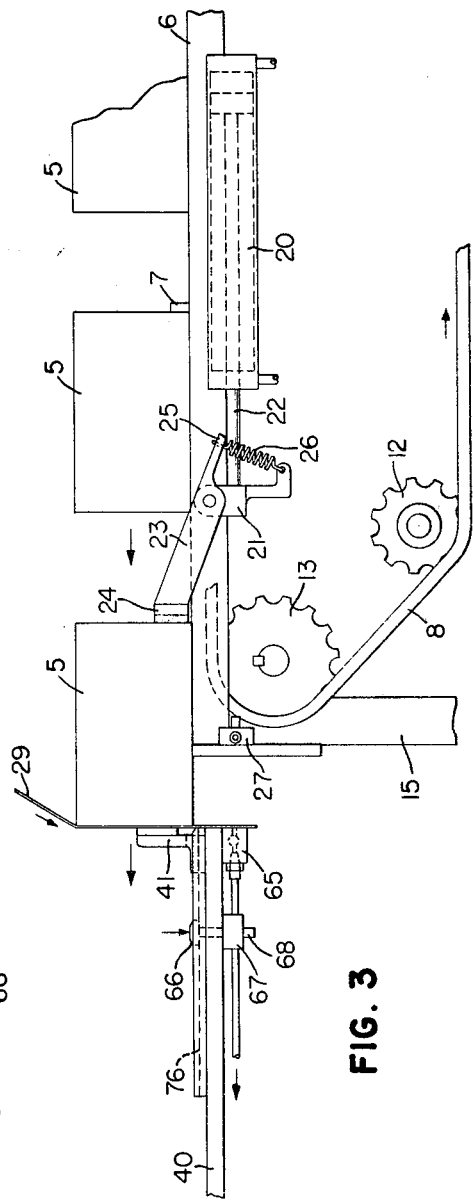

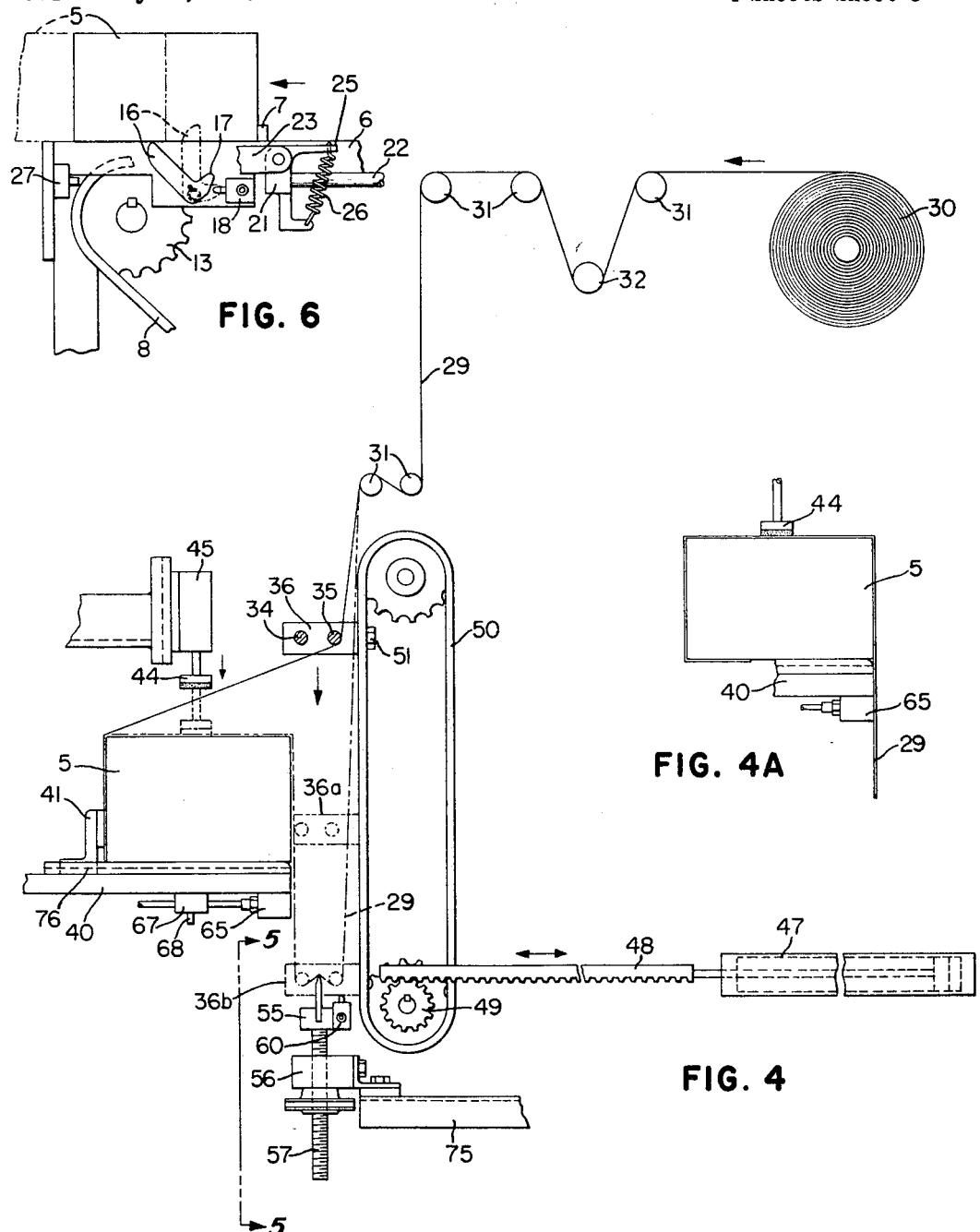

April 7, 1970  J. F. EHRENFRIED ET AL  3,504,476
METHOD OF PACKAGING
Filed July 20, 1967  4 Sheets-Sheet 4
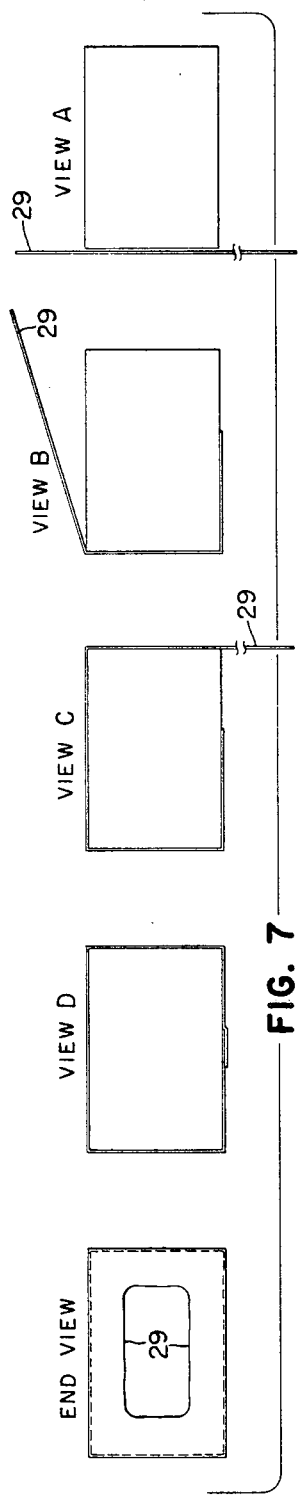
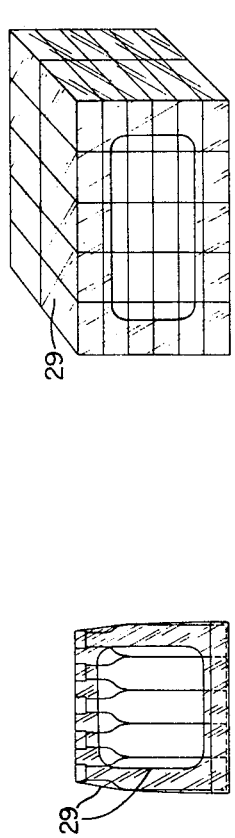
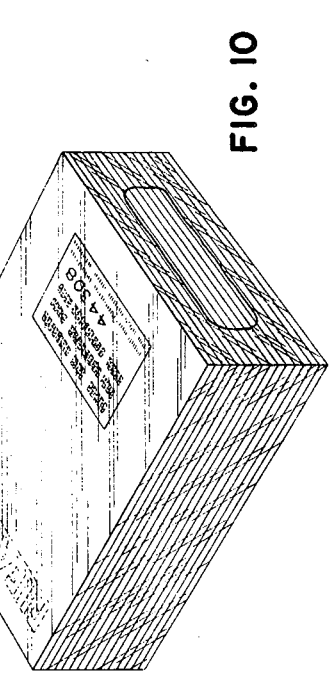
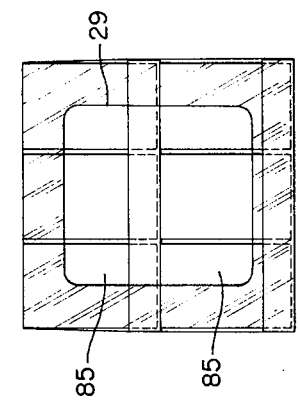
INVENTORS
JOHN F. EHRENFRIED
CHARLES M. GARDNER
BY
ATTORNEY United States Patent Office 3,504,476
Patented Apr. 7, 1970

3,504,476
METHOD OF PACKAGING
John F. Ehrenfried, Akron, and Charles M. Gardner, Manchester, Ohio, assignors to The Goodyear Tire & Rubber Company, Akron, Ohio, a corporation of Ohio
Filed July 20, 1967, Ser. No. 654,858
Int. Cl. B65b 35/50, 11/30
U.S. Cl. 53—26                                           16 Claims

ABSTRACT OF THE DISCLOSURE

The material to be packaged, referred to herein as the content of a package, may be one or more boxes, or cans on a tray or trays, or a stack of magazines, etc. A series of these, all of the same size or different sizes are fed successively to packaging equipment where each is individually wrapped in heat-shrinkable, heat-sealable film to form an open-ended package with the ends of the film overlapped under the package. The overlapped ends of the film are heated and sealed to one another. The entire package is then heated and the film is shrunk tight on the content, and the edges of the film which extended beyond the content are shrunk in over the ends of the content.

The invention relates to the packaging of materials in heat-sealable, heat-shrinkable film in successive packaging operations to form a plurality of individual packages.

The invention is well suited for the successive packaging of a wide variety of materials referred to herein as the package contents. The contents of the successive packages may be of different sizes or the same size. The ends of the contents may be of irregular shape but the central portion is of uniform cross section, being generally circular or rectangular. The ends may be flat as in a box. The contents of each single package may be one or more boxes, a plurality of bottles, canned goods on a single tray or other support or tiered on a plurality of trays or the like, a pile of magazines, etc. For instance, a plurality of cans may be supported on a shallow tray of fibrous composition, plastic, or metal, molded to fit the bottoms of the cans so as to maintain the cans in a prearranged and level position.

The invention is adapted to the wrapping of materials at their source, as at a canning factory or printing plant; or at a distribution center, as at a wholesale grocery warehouse; or at a retail outlet, as at a supermarket; or elsewhere.

The film used is preferably the type commonly referred to as a unilaterally stretched film, although biaxially oriented film may also be used. For instance, for packaging a bundle of magazines, each measuring about 8½ x 11 inches and 6 inches high, a film which on heating shrinks to 40 to 50 percent of its original size has proven satisfactory. The amount of shrink in the film must be such that on heating it forms a snug fit with the content of the intended package, but without crushing or distorting it. It may be heat-shrinkable, and heat-sealable polyvinylchloride or other vinyl film, polyester film, polyethylene or polypropylene film, etc., suitably plasticized, if necessary. Although the film is generally transparent, opaque film may be used.

The machine supplies the film as required as the content for each package is presented for packaging. The content is pushed into the film to partially wrap the film around it. Then the film is cut to the desired length and the wrapping of the film around the content is completed to form an open-ended package. The ends of the film are overlapped under the content and heat-sealed and the edges of the film extend out beyond the edges of the content of the package. The package is then heated in a shrink tunnel or other suitable equipment for heating the film to shrink it tight around the package, and shrink the open-ended edges of the film against the ends of the package content.

The invention is further described in connection with the accompanying drawings in which preferred equipment for carrying out the process is illustrated. In the drawings:

FIGURE 1 is a longitudinal elevation of the equipment taken inside of its supporting frame;
FIGURE 2 is a plan view on line 2—2 of FIGURE 1;
FIGURE 3 is an enlarged elevational detail on the line 3—3 of FIGURE 2, showing that portion of the equipment which pushes the package contents into the film and onto a turret;
FIGURE 4 is an enlarged elevational detail of the film-handling equipment and adjacent means;
FIGURE 4A is a representation similar to a detail of FIGURE 4 but after the film has been cut and the freshly cut end is held against the turret by vacuum;
FIGURE 5 is an enlarged cross-sectional detail of the cut-off mechanism on the line 5—5 of FIGURE 4;
FIGURE 6 is an enlarged cross-sectional detail of the trip which actuates the discharge mechanism shown in FIGURE 3;
FIGURE 7 illustrates schematically the various steps by which the film is wrapped around the package;
FIGURES 8 and 8A are a plan view of several cans seated in a molded tray ready for packaging, and an end view of the tray;
FIGURE 9 is a package of two tiers of canned goods;
FIGURE 10 is a package of magazines;
FIGURE 11 is a package of bottles; and
FIGURE 12 shows a packaged bundle of boxes.

The content 5 of each individual package is supplied on horizontal slide rails 6 by drive lugs 7 which are fastened to chains 8 carried by sprockets 10, 11, 12 and 13 suitably mounted in frame 15. These are driven by a motor controlled by a master switch (not shown) and the entire operation is started and stopped by this switch.

The materials to be packaged are placed on the slide rails and moved forward by lugs 7. It is not necessary to have a content 5 positioned for forward movement by each set of lugs. As the lugs move each content forward it depresses trip 16 (FIGURE 6), and when the content has passed over the trip it returns upward (due to spring means not shown) and the tip 17 actuates air switch 18 which in turn actuates the kick-off air cylinder 20 (FIGURE 1). This cylinder is between and beneath rails 6. It operates the kick-off unit (FIGURE 3). It includes block 21 fastened to plunger 22. Arms 23 pivoted to opposite ends of the block 21 carry the kick-off cross plate 24. Their rear ends 25 are pulled down by springs 26 which tend to raise the plate 24 just above the slide rails 6 so that as the plunger 22 of the cylinder 20 is extended, the plate 24 contacts the contents in succession and pushes them forward, off of the slide rails. At the forward end of the stroke of the plunger, the block 21 actuates switch 27 and this returns the plunger to its original position within the cylinder 20. The plate 24 continues in its raised position until it is pushed down by an oncoming content 5.

The film 29 is fed from the supply roll 30 over guide rolls 31 and festoon roll 32. The film hangs down beside the wiper rolls 34 and 35 mounted on carriage 36, and down across the path of the package contents as shown in FIGURE 1. As the content of each package leaves the slide rails (FIGURE 1) it is pushed into the free end of the film, the free end being of such a length as to extend under the front part of the content of the package as it is pushed from the slide rails on to turret 40 which is operated continuously by the motor, etc. shown in FIGURE 1, on an interrupted basis through a Furgeson (or Geneva) drive or the like, stopping four times in each complete cycle.

Referring to FIGURE 7, in view A the content 5 is shown as though it is on the slide rails 6. It will be seen that the free end of the film hangs down below the bottom of the package. As the content 5 is pushed into the film (view B) and onto the turret, the film is clamped between the forward face of the content 5 and the clamp bar 41 (FIGURE 3). The free end of the film slides over the top of the turret and is thus brought under the forward end of the bottom of the content 5, as shown in view B of FIGURE 7.

At the forward end of the stroke of the kick-off cylinder 20 the plate 24 comes just to the edge of the turret 40 so that the back edge of the content 5 is in line with the edge of the turret, and is then in the position shown in FIGURE 4.

When the plunger 22 of the kick-off cylinder reaches the forward end of its stroke and actuates the switch 27, this switch not only returns the plunger to the cylinder 20 but it also (1) causes the plunger 44 (FIGURE 1) to be thrust downward from cylinder 45 to press the film against the content 5 as shown in FIGURE 4 and (2) simultaneously it actuates the cylinder 47 (FIGURE 4) to move the rack 48 forward and operate the gear 49 to put the chain 50 in operation. The block 36 to which the wiper rolls 34 and 35 are attached is fastened to chain 50 by means 51. Thus, as the cylinder 47 is operated the wiper rolls are lowered through the position 36a (FIGURE 4) to the position 36b which presses the film against the stationary knife 55. As shown in FIGURE 5, this knife is supported in the bracket 56 which is attached to the frame of the apparatus (as shown in FIGURE 1) by screws 57 and it is adjusted by the handle 58 to locate the knife at the required height. As the wiper rolls press the film against the knife 55 the block 36 actuates switch 60 (FIGURES 4 and 5) so that the plunger 61 of cylinder 63 (FIGURE 1) clamps the film against the support 62. Thus the film is held taut between the clamping plate 41 and this clamp 61, 62, and as the wiper rolls reach the bottom limit of their movement the film is cut from edge to edge. The wiper rolls then return to their former position and the freshly cut edge of the film hangs over the rear end of the package as shown in view C of FIGURE 7. This free end is sucked against the block 65 by vacuum (FIGURE 4A), the vacuum switch being actuated by the weight of the content 5 on plunger 66 (FIGURE 3).

Thus the freshly cut free end of the film is held against the block 65 as the turret is rotated. The free end of the film 29 is readily seen as hanging over the rear end of the package at the middle of the turret in FIGURE 1. The free end of the film is maintained against the block 65 as the turret rotates through 180° and brings the content of the package from the end of the slide rails 6 to the sealing plate and shrink tunnel.

The turret can equally well be designed to discharge the package after traveling 90° or 270°. As a matter of fact, instead of having four positions on the turret, the turret may be designed with any number of positions and may carry the package through any desired portion of the complete cycle. If the turret is designed with four package positions and carries the package through only 90°, the number of packages handled by the machine can readily be doubled by providing a second feeding and film-cutting unit on the opposite side of the turret.

The plunger 66 which actuates the vacuum valve 67 (FIGURE 3) extends below the valve box and when the turret has turned through 180°, the bottom 68 of this plunger actuates the valve 70 (FIGURE 1) and this activates the cylinder 75 (FIGURES 1 and 2) which is suspended from the portion 15 of the frame above the turret. The plunger of the cylinder 75 is extended and presses against the clamp bar 41 which moves the package from the turret onto a sealing belt 77.

The four stations of the turret are designated by the letters A, B, C and D in FIGURE 2. As the turret rotates it stops at each of these stations. At Station A there is no package on the turret and the clamp bar 41 is at the edge of the turret. The base of the clamp bar is dove-tailed into the surface of the support on the turret, as indicated at 76 in dotted lines. As the turret is rotated to Station B and stops there, the content of a package is pushed into the film and against the clamp bar 41 and pushes it radially toward the center of the turret, as shown. While the turret is rotated to Station C, the freshly cut bottom end of the film is sucked by vacuum to the edge of the turret and held there to prevent it from unwrapping. When the turret is rotated to position D the bottom of plunger 68 (FIGURE 1) actuates valve 70 and the plunger of cylinder 75 pushes against the clamp bar 41 and pushes the content on to belt 77, as above described. Then the turret is rotated to position A.

As the package moves on to the belt the end of the film which we have referred to as the freshly cut end of the film which has been hanging down over the edge of the turret and is held there by vacuum, is slid upward so that it is free of the vacuum opening and it is folded under the package where it overlaps the opposite end of the film, as indicated in view D of FIGURE 7. The sealing plate 78 heats the belt and the overlapped ends of the film which are at the bottom of the package. Thus the film is sealed into a tube with its ends extending from the opposite edges of the package. The belt carries the package through the heating tunnel 79 where the entire film is heated and shrunk. It shrinks longitudinally into tight contact with the content of the package and the edges of the film are shrunk down over the ends of the content of the package as indicated in the end view in FIGURE 7.

The entire operation is automatic and controlled by the single main switch. The different kinds of packages which are to be described go through the same series of packaging steps.

The equipment lends itself readily to the packaging of canned goods either for display as a completed package on the shelf of a supermarket, or for delivery of the canned goods to the shelf where they are transferred from the package to the shelf by an attendant and eventually removed individually by the shopper. In the package illustrated in FIGURES 8 and 8A any convenient number of cans 85 are located in a molded plastic tray 86 with depressions 87 equal to the number of cans. If there are chimes on the cans, these depressions need be only slightly deeper than the depth of the chimes, the chimes of the separate cans being thus separately engaged in the tray. Such a tray may be formed from plastic by molding depressions, such as shown, into it, or it may be fabricated from a thin sheet of metal, for instance, which is of substantially uniform thickness after shaping. The tray may, for example, mold four cans for convenient handling by the shopper, or as many as six or nine or more. As a matter of fact, two or more of these loaded trays may be stacked one on top of another, and wrapped together, forming an individual package. The housewife or other person can easily lift such a package by inserting several fingers under the inturned shrunken edge of the film at the end of the package. After release, the film will usually retract to its original position adjacent the end of the content of the package. A tear tape for opening the package can readily be provided by equipment which operates on the content of the package either before the film is applied or thereafter.

FIGURE 9 illustrates a different type of packaged cans. The drawing shows two tiers of cans in a single package, but it is to be understood that the package may contain a single tier or more than two tiers of cans. In the packaging operation, successive packages may contain a different number of tiers. Each tier of cans is supported on a separate support which may be a tray or a perfectly flat plate of cardboard or the like. These supports are all of the same area and may be just the area of the assembled cans, although they need not be quite as large as the area covered by the cans. In forming such a package the several tiers of cans may be delivered automatically to the slide rails, or each of the separate supports carrying its own cans may be separately delivered, and the different tiers will then be stacked on one another while resting on the slide rails. Cans packaged in this manner need not be placed in cartons but may be delivered directly to the supermarket and the attendant there may take the package to the shelf where the cans are to be displayed before opening the package. Alternatively, small packages of this type may be placed on the shelf to be purchased by a customer.

Boxes may be similarly bundled with or without a support. They may be stacked vertically or horizontally or both. For instance, many small packages or pharmaceuticals may be bundled into a larger package enclosed by film as herein described, and such film-covered packages may then be placed in a master shipping carton. This saves the expense of small cartons.

FIGURE 10 shows a package of magazines. The magazines are all of one issue and therefore of one shape. They are stacked one above another. Successive packages may contain a different number of magazines so that packages can be shipped and delivered without repackaging, the number of magazines in each package being that required by the respective customers. Thus, there may be four magazines in one package and six magazines in the next package, or perhaps many more. The number of magazines per package may be determined by the number of magazines to be mailed to the different ZIP-code numbers of the subscribers. The number of magazines shipped to each ZIP-code number will be stacked in individual piles on the slide rails and move successively to the packaging equipment. On each stack there may be placed a card or the like giving the ZIP-code number and whatever additional information will be useful. Thus in the finished package this card will be visible through the film on the opposite side of the package from that at which the ends of the film are heat-sealed together. Thus the packages may be readily shipped directly from the end of the packaging machine to the postoffice. The individual magazines may be addressed to individual subscribers, but where the magazines are sent to dealers, such individual addressing is not required. Thus, successive stacks of magazine will move along the slide rails, often with different numbers of magazines in adjacent stacks and all will be packaged, in turn, in the manner described. The bound edge of the bottom of each stack will be faced forward so that the stack can be transferred from the slide rails to the turret without scuffing up the bottom magazine which would become scuffed if the bound edge were not forward. All of the magazines may be faced in this manner, although it may be desirable to turn some of the upper magazines in each stack so that the bound edge is to the rear.

Books can be packaged similarly, and where they are packaged for distribution, different numbers of books may be put in successive packages. Also, if a book is published in several volumes, all volumes may be bound together. If the books are paper covered the binding of the bottom book will advantageously be faced toward the front of the package. (In the claims, magazines are included in the expression "soft-covered books."). If the book is hardcovered, this is not necessary. Although generally the bound edge of a magazine or paper-back will be made the leading edge, it is not impossible that some other edge such as the top or bottom of the book, or even the edge opposite the bound edge may be placed forward.

Bottles may be packaged on a tray or other support in a manner similar to that discussed in the packaging of canned goods. One or more tiers of bottles may be packaged in this way. If the bottles are glass bottles, the film when shrunken tight around the bottles prevents the bottles from moving and hitting against one another, and thus reduces or eliminates breakage of the bottles, whether empty or filled. It is conceivable that the transfer of a plurality of upright bottles before being wrapped can be transferred from the slide rails to the turret over a removable bridge or the like so that the support can be eliminated. The idea of shrinking a wrapper around bottles to hold them tight against one another to prevent them from breaking is novel and one of the patentable features of the invention.

FIGURE 12 illustrates a bundle of boxes. If the boxes are relatively flat they may be stacked one on top of another much as magazines may be stacked, and then there is no difficulty in wrapping them into a single package by the method here described. Boxes of square cross section may be similarly packaged. The boxes may contain foodstuffs, pharmaceuticals, hardware, etc. If the boxes are to be delivered to subscribers of gifts of various types to be delivered monthly or at other regular intervals, different numbers of boxes to be delivered to the areas covered by different zip codes of the postal system will be packaged in successive bundles.

The invention is useful in a wide variety of different packaging operations only a few of which are described and shown, as illustrative.

We claim:

1. The method of forming a package by wrapping the content of the package in a flexible wrapper which comprises (1) moving the content of the package into an expanse of the wrapper onto a first support and (2) engaging the bottom end of the wrapper under the forward end of the content and (3) holding it between the content and the support, then while thus holding said end of the wrapper, (4) bringing the expanse of the wrapper over the top and rear end of the content and (5) cutting the wrapper off below the bottom surface of the rear end of the content so that this end of the wrapper hangs below the support, and then (6) removing the package from the support by rotataing it at an angle and moving it on to a second support and thereby (7) bringing the freshly cut end of the wrapper under the rear end of the bottom of the content and thereby (8) overlapping the two ends of the wrapper, steps (1) and (6) being carried out in the same horizontal plane.

2. The method of claim 1 in which the angle is 180 degrees.

3. The method of claim 1 in which the angle is 90 degrees.

4. The method of claim 1 in which the wrapper is longitudinally shrinkable film and the method comprises, after overlapping the ends of the film, sealing them to one another and shrinking the film tight against the content.

5. The method of claim 1 in which the wrapper is heat-sealable plastic film and the method comprises, after overlapping the ends of the film, sealing them to one another.

6. The method of claim 5 in which film is heat-shrinkable and the edges of the film extend beyond the ends of the content forming an open-ended wrapper, and the method comprises, after overlapping the ends of the film, heat-sealing them together and thereafter heating the entire area of the film whereby said extending edges of the film are shrunk against the ends of the content.

7. The method of claim 6 in which the content is a plurality of units and the method comprises bundling them together in the packaging operation.

8. The method of claim 6 in which a plurality of units on a support is packaged, which method comprises moving the support with a plurality of units thereon into the film and packaging the units on the support during the packaging operation.

9. The method of claim 6 which comprises moving a stack of soft-covered books into the film and packaging them into the packaging operation.

10. The method of wrapping the content of a package in heat-shrinkable, heat-sealable wrapping film which comprises hanging the film between the content and a support, there being a flat clamp bar slidably positioned at the edge of the support, moving the content into the film and sliding it over the support against the clamp bar thereby bringing the bottom edge of the film between the support and the bottom of the front end of the content, then bringing the film over the top and rear end of the package and cutting off the portion of the film wrapped on to the content from the balance of the film, with the freshly cut end of the film hanging below the surface of the support, then rotating and moving the content from the support by pushing the clamp bar against the film which is over the front end of the content and thereby sliding the content onto a second support while holding the film to the content and bringing the freshly cut end of the film under the content into overlapping relation with said bottom edge of the film, heat-sealing the two ends of the film together and heating the package and shrinking the film tight around the content, the steps of moving the content into the film, sliding it over the support and moving the content from the support and sliding the content on to a second support, all being carried out in substantially the same horizontal plane.

11. The method of wrapping the content of a package which comprises hanging heat-sealable plastic film between a turret and the content to be packaged, pushing the content into the film and radially on to the turret and thereby bringing the bottom end of the film under the bottom of the forward end of the content, bringing the opposite end of the film down over the content and over its rear end and allowing it to hang below the top of the turret, rotating the turret in a substantially horizontal plane and then while holding the film to the content moving the content radially back off of the turret on to another support and thus bringing said opposite end of the film under the content so that both ends of the film are overlapped, and then sealing said overlapped ends by heating them.

12. The method of packaging a plurality of soft-covered books in a package which comprises stacking the books on one another, pushing the stack into heat-shrinkable, heat-sealable packaging film thereby bringing one end of the film under the stack, and while maintaining the stack in a sufficiently upright position to prevent the books from sliding on one another, wrapping the stack in the film by rotating the stack in a substantially horizontal plane and bringing the opposite ends of the film into overlapped position under the stack with the edges of the film extending beyond the edges of the stack forming an open-ended wrapper about the content, then heating the overlapped ends of the film and thereby sealing them together, and then heating the package and shrinking the film tight around it and shrinking the edges of the film down on to the ends of the stack.

13. The method of packaging stacks of magazines succesively in transparent film, which comprises placing an address card on the top of each stack, wrapping the stacks in successive portions of a length of the film and bringing the ends of said portions successively into overlapping relation under the respective stacks and then sealing said overlapping ends together.

14. The method of forming a package by wrapping the content of the package in a flexible wrapper which comprises moving the content of the package into a substantially vertical expanse of the wrapper on to a first support and engaging the bottom end of the wrapper under the forward end of the content and holding it between the content and the support, then while thus holding said end of the wrapper, bringing the expanse of the wrapper over the top and rear end of the content and cutting the wrapper off below the bottom surface of the rear end of the content so that this end of the wrapper hangs below the support, and then removing the package from the support by rotating the support in a substantially horizontal plane at an angle and moving the package on to a second support and thereby bringing the freshly cut end of the wrapper under the rear end of the bottom of the content and thereby overlapping the two ends of the wrapper.

15. The method of forming a package by wrapping the content of the package in a flexible wrapper which comprises moving the content into an expanse of the wrapper and on to rotatable means in a substantially horizontal plane and thereby bringing the bottom end of the wrapper under the forward end of the content and holding it between the content and the rotatable means, then while thus holding said end of the wrapper, bringing the expanse of the wrapper over the top and rear end of the content and cutting the wrapper off below the bottom surface of the rear end of the content so that this end of the wrapper hangs below the rotatable means, then rotating the means and removing the content therefrom after the means has been rotated through an angle which angle is no greater than 270 degrees, on to another support in substantially the same horizontal plane with its rear end leading and thus bringing the cut end of the wrapper between the rear end of the content and said another support and into overlapping relation with said bottom end of the wrapper.

16. The method of forming a package by wrapping the content of the package in a flexible wrapper by moving the content in a substantially straight line through the operation of bringing the wrapper over the top and rear of the content, which comprises moving the content of the package in a substantially straight line in a substantially horizontal plane into an expanse of the wrapper on to a first support and engaging the bottom end of the wrapper under the forward end of the content and holding it between the content and the support, then while thus holding said end of the wrapper and while the content is still in said straight line, bringing the expanse of the wrapper over the top and rear end of the content and cutting the wrapper off below the bottom surface of the rear end so that this end of the wrapper hangs below said plane, and then rotating the content and thereby bringing the freshly cut end of the wrapper under the rear end of the bottom of the content and thereby overlapping the two ends of the wrapper.

References Cited

UNITED STATES PATENTS

| | | | |
|---|---|---|---|
| 2,347,560 | 4/1944 | Hoppe | 53—210 |
| 3,331,503 | 7/1967 | Brown | 53—30 X |

TRAVIS S. McGEHEE, Primary Examiner

E. F. DESMOND, Assistant Examiner

U.S. Cl. X.R.

53—30, 33, 210